US012646368B2

(12) United States Patent
Alter et al.

(10) Patent No.: US 12,646,368 B2
(45) Date of Patent: Jun. 2, 2026

(54) SYSTEMS AND METHODS FOR MONITORING WAIT TIMES

(71) Applicant: Universal City Studios LLC, Universal City, CA (US)

(72) Inventors: David John-Louis Alter, Orlando, FL (US); Robert Michael Jordan, Orlando, FL (US); Jonathan Michael Voss, Flower Mound, TX (US); Gregory Paul Habiak, Orlando, FL (US)

(73) Assignee: UNIVERSAL CITY STUDIOS LLC, Universal City, CA (US)

( * ) Notice: Subject to any disclaimer, the term of this patent is extended or adjusted under 35 U.S.C. 154(b) by 0 days.

(21) Appl. No.: 18/296,229

(22) Filed: Apr. 5, 2023

(65) Prior Publication Data

US 2024/0338988 A1 Oct. 10, 2024

(51) Int. Cl.
*G07C 11/00* (2006.01)

(52) U.S. Cl.
CPC .......... *G07C 11/00* (2013.01); *G07C 2011/02* (2013.01); *G07C 2011/04* (2013.01)

(58) Field of Classification Search
CPC .. G07C 11/00; G07C 2011/02; G07C 2011/04
See application file for complete search history.

(56) References Cited

U.S. PATENT DOCUMENTS

| | | | | |
|---|---|---|---|---|
| 7,167,576 B2 | 1/2007 | Steenburgh et al. | | |
| 7,688,349 B2 | 3/2010 | Flickner et al. | | |
| 8,224,028 B1 | 7/2012 | Golan et al. | | |
| 10,902,441 B2 | 1/2021 | Klima et al. | | |
| 2008/0312871 A1 | 12/2008 | Salcedo | | |
| 2013/0332509 A1* | 12/2013 | Schwartz | G07C 11/00 | 709/203 |
| 2016/0191865 A1 | 6/2016 | Beser et al. | | |
| 2016/0321548 A1 | 11/2016 | Ziskind et al. | | |
| 2019/0347911 A1* | 11/2019 | Linguanti | G06Q 10/02 | |
| 2019/0385173 A1* | 12/2019 | Johnsen | G06V 20/52 | |
| 2020/0111031 A1 | 4/2020 | Wakim et al. | | |

(Continued)

OTHER PUBLICATIONS

Shao, Jing, Chen Change Loy, and Xiaogang Wang. "Scene-independent group profiling in crowd." Proceedings of the IEEE conference on computer vision and pattern recognition. 2014. (Year: 2014).*

(Continued)

*Primary Examiner* — Scott M Tungate
(74) *Attorney, Agent, or Firm* — Fletcher Yoder, P.C.

(57) ABSTRACT

An amusement park attraction system includes a queue area and a controller configured to receive first sensor data indicative of one or more first notable attributes associated with a first group of guests in the queue area, receive second sensor data indicative of one or more second notable attributes associated with a second group of guests in the queue area, compare the first sensor data and the second sensor data to one another, determine a confidence score associated with a match between the first group of guests and the second group of guests based on comparison between the first sensor data and the second sensor data, and output a control signal in response to determining the confidence score exceeds a threshold value.

21 Claims, 7 Drawing Sheets

(56) References Cited

U.S. PATENT DOCUMENTS

| | | | | |
|---|---|---|---|---|
| 2021/0166161 | A1 | 6/2021 | Polk et al. | |
| 2021/0248519 | A1* | 8/2021 | Puglisi | G06Q 10/06311 |
| 2023/0162552 | A1* | 5/2023 | Bass | G07C 9/27<br>705/5 |
| 2023/0377188 | A1* | 11/2023 | Ikeda | G06T 7/62 |

OTHER PUBLICATIONS

PCT/US2024/022662 International Search Report and Written Opinion mailed Jul. 3, 2024.

Attractions.io, "How to automatically measure wait times at your theme park," Feb. 2018, 11 pages, https://attractions.io/learn/automatically-measure-wait-times-theme-park.

* cited by examiner

SYSTEMS AND METHODS FOR MONITORING WAIT TIMES

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Amusement parks and other entertainment venues have a variety of features to entertain guests. For example, an amusement park may include an attraction system, such as a ride (e.g., a roller coaster), a theatrical show, an extended reality system, and so forth. Because amusement parks are growing in popularity and often receive a large quantity of guests at any given time, certain attractions of an amusement park may be consistently at capacity. For this reason, guests may have to wait in a queue area (e.g., a line) before experiencing the attraction. An amount of time in which a guest may have to wait may be based on various factors, such as a current quantity of guests waiting in the queue area, a duration of a cycle of operation of the attraction system, and/or a guest capacity of a cycle of operation of the attraction system.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In an embodiment, an amusement park attraction system includes a queue area and a controller configured to receive first sensor data indicative of one or more first notable attributes associated with a first group of guests in the queue area, receive second sensor data indicative of one or more second notable attributes associated with a second group of guests in the queue area, compare the first sensor data and the second sensor data to one another, determine a confidence score associated with a match between the first group of guests and the second group of guests based on comparison between the first sensor data and the second sensor data, and output a control signal in response to determining the confidence score exceeds a threshold value.

In an embodiment, a non-transitory computer-readable medium includes instructions that, when executed by processor, are configured to cause the processor to receive a plurality of sensor data indicative of one or more notable attributes associated with respective groups of guests in a queue area of an amusement park attraction system, compare a first sensor data of the plurality of sensor data with a second sensor data of the plurality of sensor data, determine a confidence score associated with comparison between the first sensor data of the plurality of sensor data and the second sensor data of the plurality of sensor data exceeds one or more threshold values, determine a duration of time between capture of the first sensor data of the plurality of sensor data and of the second sensor data of the plurality of sensor data; and output a control signal in response to and/or based on the duration of time.

In an embodiment, an attraction system of an amusement park includes a queue area and a controller configured to receive first sensor data indicative of one or more first notable attributes associated with a first group of guests in a first location of the queue area, receive second sensor data indicative of one or more second notable attributes associated with a second group of guests in a second location of the queue area, determine a confidence score based on comparison between the first sensor data and the second sensor data, the confidence score being associated with a match between the first group of guests and the second group of guests, compare the confidence score to a threshold value, determine a wait time based on a duration of time between capture of the first sensor data and capture of the second sensor data in response to determining the confidence score exceeds the threshold value, the duration of time being indicative of an amount of time elapsed during progression from the first location to the second location of the queue area, and adjust operation of the attraction in response to and/or based on the determined wait time.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
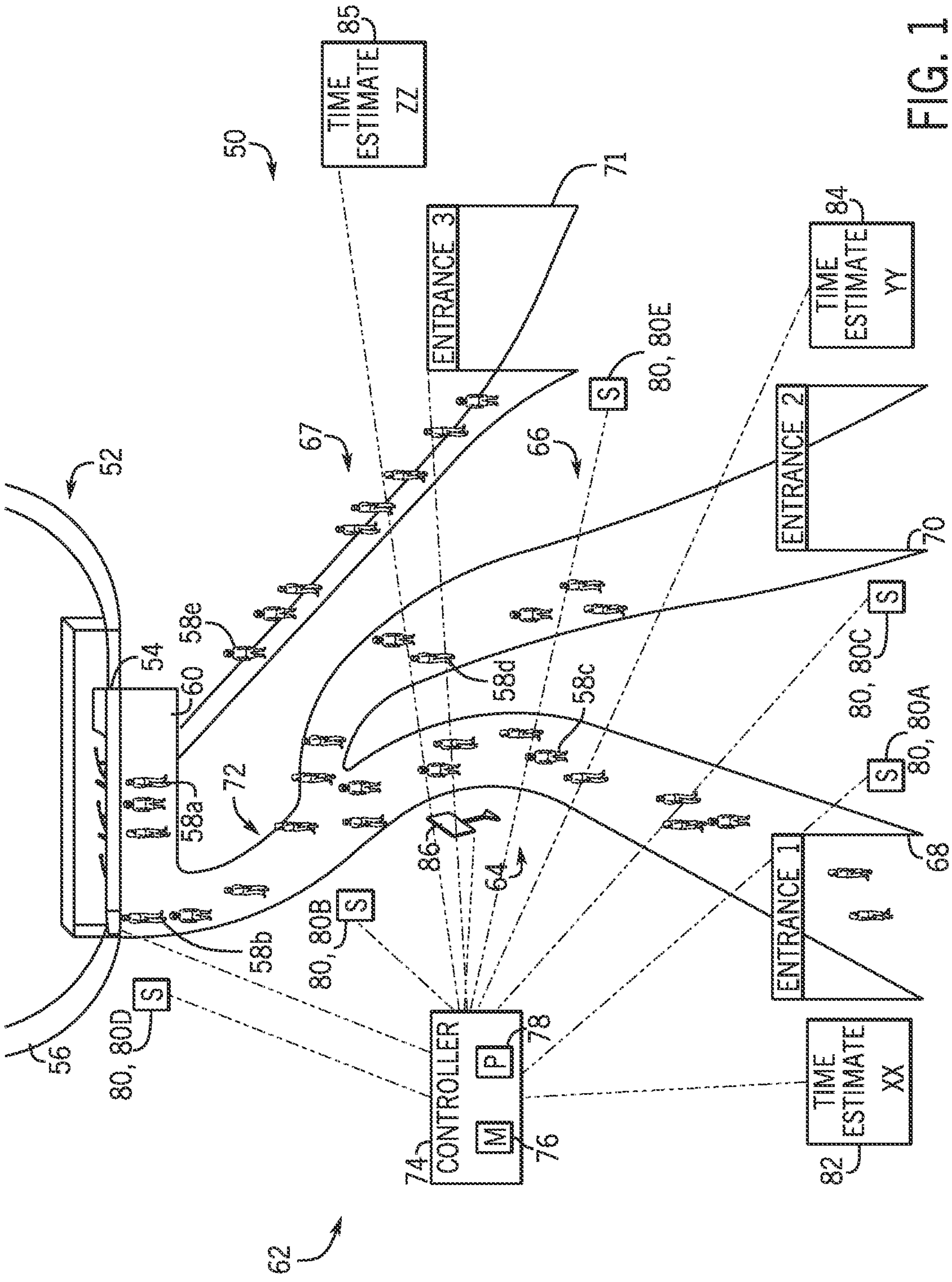
FIG. 1 is a perspective view of an embodiment of an amusement park attraction system having a controller configured to determine a wait time, in accordance with an aspect of the present disclosure.

One or more specific embodiments of the present disclosure will be described below. In an effort to provide a concise description of these embodiments, all features of an actual implementation may not be described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features.

As used herein, the terms "approximately," "generally," "substantially," and so forth, are intended to convey that the property value being described may be within a relatively small range of the property value, as those of ordinary skill would understand. For example, when a property value is described as being "approximately." equal to (or, for example, "substantially similar" to) a given value, this is intended to convey that the property value may be within +/−5%, within +/−4%, within +/−3%, within +/−2%, within +/−1%, or even closer, of the given value. Similarly, when a given feature is described as being "substantially parallel" to another feature, "generally perpendicular" to another feature, and so forth, this is intended to convey that the given feature is within +/−5%, within +/−4%, within +/−3%, within +/−2%, within +/−1%, or even closer, to having the described nature, such as being parallel to another feature, being perpendicular to another feature, and so forth. Mathematical terms, such as "parallel" and "perpendicular," should not be rigidly interpreted in a strict mathematical sense, but should instead be interpreted as one of ordinary skill in the art would interpret such terms. For example, one of ordinary skill in the art would understand that two lines that are substantially parallel to each other are parallel to a substantial degree, but may have minor deviation from exactly parallel.

An amusement or theme park may have attraction systems to entertain a variety of guests. For instance, the attraction systems may include a roller coaster, a dark ride, a log flume, a performance show; a character meet-and-greet, and the like. An attraction system may operate multiple cycles of operations throughout the day. As an example, the attraction system may include a ride vehicle that travels along a circuit of a ride track to complete a cycle of operation. As another example, the attraction system may include actors and/or show effects that provide a performance routine during each cycle of operation. Different guests may experience the attraction system at each cycle of operation.

Unfortunately, the attraction system may be limited in capacity. As a result, a cycle of operation of the attraction system at capacity may accommodate a threshold quantity of guests of the amusement park. Thus, any guests in addition to the threshold quantity may have to wait during the cycle of operation, such as until after the cycle of operation of the attraction system has been completed, to experience the attraction system. As an example, for a roller coaster attraction, guests may wait until a ride vehicle has completed a circuit of a ride track. After the ride vehicle has completed the circuit, passengers of the ride vehicle will disembark to enable additional guests to enter the ride vehicle. Guests may physically wait in a queue area, such as a line, before experiencing the attraction system. However, the queue area may not provide adequate entertainment for guests. Additionally, guests may not be able to experience other attractions when waiting in the queue area. For this reason, a guest may want to know how long a wait time is for an attraction system to determine whether to join the queue area to experience the attraction system or to bypass the attraction system, such as in favor of another attraction system that may have a shorter wait time. Therefore, a guest may select a more suitable attraction system based on wait time. As such, providing an accurate wait time to guests may improve an overall experience for the guests.

Accordingly, it is recognized that accurately determining a wait time for an attraction system may provide benefits for operation of the amusement park to entertain guests. Thus, the present disclosure is directed to systems and methods for monitoring guest flow through a queue area and determining a wait time based on the guest flow. Guest flow is monitored based on one or more notable attributes of one or more guests. For example, first sensor data indicative of first notable attributes of a first group of guests at a first location of the queue area and second sensor data indicative of second notable attributes of a second group of guests at a second location of the queue area may be received.

As provided herein, notable attributes may include various features or characteristics of guests, such as a body dimension (e.g., a height), a type of clothing being worn, tattoos, jewelry, clothing patterns, hair color, type of clothing (short sleeve vs long sleeve, hooded, button down, zippers, etc.), color of clothing, symbols, accessories (like purses, backpacks, sunglasses, glasses fanny pack) that may be different between certain guests to distinguish some guests from one another. In some cases, the notable attributes may be semi-unique attributes that are shared by other guests (e.g., presence of a white hat). Further, the notable attributes may include dynamic attributes that may change within a relatively short time frame, such as a selection of clothing or accessories (e.g., hat, jacket, bag) and that are likely to be different upon subsequent visits.

Accordingly, other guests may share some of the same notable attributes. As such, each individual guest may remain sufficiently anonymous while the notable attributes are monitored, but the notable attributes may be used to distinguish groups or combinations of guests from one another. For example, the controller may detect a group of six guests that include five adults and one child may have certain notable attributes of six different heights and six different shirt colors. Although other groups of guests may share a subset of these notable attributes (e.g., one of the heights, one of the shirt colors), a likelihood of another group of guests that share all of these notable attributes may be sufficiently small such that there is a high likelihood that a detected group having all of these notable attributes is the group of interest. Indeed, any of the notable attributes, such as a pattern of height difference between at least some of the guests in the group, may be sufficiently unique to identify this group within the queue area while maintaining anonymity for each individual guest in this group. Thus, while each individual notable attribute may not be uniquely identifying for any given individual, a combination of notable attributes of individuals in a group may be sufficient to distinguish this group within the queue area without using personally identifiable information and/or more unique guest attributes.

Anonymity may be further preserved when at least some of the notable attributes, such as clothing attributes, are not permanent.

In an embodiment, the notable attributes may include uniquely identifying attributes such as facial arrangement attributes used for facial recognition, biometric characteristics, permanently identifying characteristics, presence of guest-associated items (e.g., machine-readable cards), or other techniques to monitor guest flow. Thus, in certain cases, guests may be monitored over a period of time using one or more notable attributes that may be non-uniquely identifying in one context and uniquely identifying in another context.

For example, different groups of guests may have various sets or collections (e.g., permutations) of notable attributes. Thus, the respective notable attributes of different groups of guests may be sufficiently unique to distinguish a particular group of guests from other groups of guests. For this reason, notable attributes of respective sensor data of respective locations may be compared to one another to identify progress of a group of guests navigating the queue area (e.g., based on operation of the attraction system to iteratively entertain guests). As an example, the first notable attributes indicated by the first sensor data may be compared with the second notable attributes indicated by the second sensor data. A confidence score associated with a match between the notable attributes may be determined based on the comparison, such as a similarity between the respective notable attributes of the first and second sensor data, to indicate a likelihood that the first group of guests having the first notable attributes and the second group of guests having the second notable attributes match one another. For example, a relatively higher confidence score may indicate that the first group of guests and the second group of guests likely include the same guests. Therefore, the second sensor data indicates progression of the guests from the first location to the second location. Thus, in response to a determination that the confidence score is above a threshold value, a duration of time between capture of the first sensor data and capture of the second sensor data may be determined. The duration of time may indicate an amount of time elapsed for the guests to navigate from the first location to the second location. A wait time (e.g., a total wait time) associated with the queue area may then be determined based on the duration of time. For example, the wait time may be determined based on the duration of time and other information, such as operation of the attraction system, guest flow in the amusement park, and/or historical information, to provide a more accurate wait time estimate. A control signal may then be output based on the wait time, such as to operate the attraction system more suitably (e.g., to present the determined wait time to guests, to adjust a cycle of operation).

With the preceding in mind, FIG. 1 is a perspective view of an embodiment of an attraction system 50 of an amusement park. The attraction system 50 may include a ride 52 that has a ride vehicle 54 configured to travel along a path or track 56 during a cycle of operation of the attraction system 50. The disclosed monitoring techniques may be used to track the flow of guests 58 at various time points within the attraction system. For example, guests **58*a* may enter the ride vehicle 54 at a loading/unloading station 60, and the ride vehicle 54 may then begin a cycle of operation and travel along the path 56. The ride vehicle 54 may then enter the loading/unloading station 60 after completion of the cycle of operation, and the guests 58*a* may exit from the ride vehicle 54. In an additional or alternative embodiment, the guests 58*a* may enter and exit the ride vehicle 54 at separate loading stations and unloading stations for a cycle of operation of the attraction system 50**.

The ride vehicle 54 may include a limited capacity and may carry a threshold quantity of the guests **58*a* during each cycle of operation. As such, when there are more guests 58, denoted as guests 58*b*, in the attraction system 50 than the threshold quantity that may be accommodated during a cycle of operation, the guests 58*b* may wait for another cycle of operation to be able to experience the ride 52. Thus, the guests 58*b* may wait until the ride vehicle 54 has completed navigation of the path 56 before being able to enter the ride vehicle 54. In this manner, each cycle of operation of the attraction system 50** may entertain different guests.

For this reason, the attraction system 50 may include a queue area or system 62 in which the guests 58 may wait before entering the ride vehicle 54. The queue area 62 may guide the guests 58 toward the ride 52, organize the guests 58 to enter the ride vehicle 54, and/or provide entertainment (e.g., a visual effect, an audio effect, a fluid effect, a tactile effect) for the guests 58 in the queue area 62. For example, the queue area 62 may enable individual guests 58 and/or multiple guests 58 (e.g., a family, a friend group) to sequentially experience the ride 52, such as based on an order in which the guests 58 entered the queue area 62.

In the illustrated embodiment, the queue area 62 includes a first queue line 64, a second queue line 66, and a third queue line 67. However, it should be understood that more or fewer queue lines are also contemplated. The first queue line 64 may direct guests **58*c* from a first entrance 68 to the loading/unloading station 60, the second queue line 66 may direct guests 58*d* from a second entrance 70 to the loading/unloading station 60, and the third queue line 67 may direct guests 58*e* from a third entrance 71 to the loading/unloading station 60. Thus, guests 58 may utilize the first queue line 64, the second queue line 66, or the third queue line 67 to enter the ride 52. By way of example, the first queue line 64 may be a primary or regular queue line that relatively more guests 58*c* may utilize to wait for the ride 52. The second queue line 66 may be a secondary or exclusive queue line that relatively fewer guests 58*d* may utilize to wait for the ride 52. For instance, a limited quantity of guests 58*d*, such as guests 58*d* who pay an extra amount of money, guests 58*d* who won a prize, and/or guests 58*d* who received an exclusive invite, may use the second queue line 66 instead of the first queue line 64. The third queue line 67 may accommodate guests 58*e* who are not part of a group (e.g., single riders), The first queue line 64 and the second queue line 66 may converge at a merge point 72 (e.g., a junction), at which the guests 58*d* from the second queue line 66 may join guests 58*c* from the first queue line 64. For example, a ride operator or other worker of the attraction system 50 may direct the guests 58*c*, 58*d* to progress toward the ride 52. The third queue line 67 may connect directly to the loading/unloading station 60 to permit ride operators to identify single riders 58*e* that can be accommodated during a ride cycle of the ride 52**.

In an embodiment, the guests **58*c* in the second queue line 66 may experience a shorter wait as compared to the wait for guests 58*d* in the first queue line 64. For example, the relatively fewer quantity of guests 58*d* in the second queue line 66 and/or a relatively shorter distance from the second entrance 70 to the merge point 72 may enable the guests 58*d* to progress to the merge point 72 more quickly via the second queue line 66. Thus, the guests 58*d* may progress toward the loading/unloading station 60 more quickly via the second queue line 66. For this reason, the respective wait times associated with the queue lines 64, 66 may be different from one another. With respect to the third queue line 67, the wait time may be a function of the ability of the ride operators to accommodate single rider guests 58e. Thus, the third queue line 67 may have shorter or longer wait times that one or both of the first queue line 64 or the second queue line 66, depending on the makeup of the guest groupings in the first queue line 64 and/or the second queue line 66. For example, certain numerical groupings of guests 58c, 58d may create more single rider seats while other groupings may tend to fill up available seats more completely, thus leaving fewer single rider seats. In a specific example, a group of 7 guests that are determined to be likely part of a family or friend group, e.g., a riding group, will leave a single seat on an eight-seat ride vehicle. The disclosed techniques may permit more accurate estimations of the guests 58 within a queue line that are likely to be seated together in a riding group. Based on these groupings, the system 50 may generate estimated wait times for the third queue line 67** as disclosed herein.

It may be desirable to determine the respective wait times associated with the queue lines 64, 66, 67. For example, a determined wait time may be presented to guests 58 who have yet to enter the queue area 62 to enable the guests 58 to determine whether to wait in the queue area 62 (e.g., or to enter a queue area for a different attraction system). Additionally or alternatively, the determined wait time may be used to adjust operation of the attraction system 50, such as to change a number of ride vehicles 54 in operation to entertain the guests 58 more efficiently (e.g., to reduce the wait time of the guests 58 in the queue area 62) and/or to adjust a manner in which the guests 58d in the second queue line 66 combines with the guests 58c in the first queue line 64 at the merge point 72 (e.g., to change the wait time of the guests 58c in the first queue line 64) or to adjust a manner in which single rider guests 58e are accommodated. In another example, an individual guest may be eligible for more than one queue line, and may select the queue line with the shortest wait time.

For this reason, the attraction system 50 may include a controller 74 (e.g., an automation controller, a programmable controller, an electronic controller, control circuitry, a cloud computing system, a control system) configured to determine the respective wait times associated with the queue lines 64, 66. The controller 74 may include a memory 76 and processor 78 (e.g., processing circuitry). The memory 76 may include volatile memory, such as random-access memory (RAM), and/or non-volatile memory, such as read-only memory (ROM), optical drives, hard disc drives, solid-state drives, or any other non-transitory computer-readable medium that includes instructions to operate the attraction system 50. The processor 78 may be configured to execute such instructions. For example, the processor 78 may include one or more application specific integrated circuits (ASICs), one or more field programmable gate arrays (FPGAs), one or more general purpose processors, or any combination thereof. The controller 74 may determine the respective wait times based on various parameters. For example, the controller 74 may be communicatively coupled to one or more sensors 80 configured to monitor certain parameters and to transmit sensor data indicative of the monitored parameters. The controller 74 may receive sensor data from the sensors 80 and determine the respective wait times based on the parameters indicated by sensor data.

In an embodiment, the sensors 80 may include an optical sensor (e.g., a camera, a visible light sensor, a nonvisible light sensor, a color sensor, a thermal sensor) and/or a position sensor (e.g., a laser sensor, a light detection and ranging sensor), and the parameters may include various attributes or characteristics associated with the guests 58. Such characteristics may include notable attributes that may be different between certain guests 58. For example, the notable attributes may include a body dimension (e.g., a height, a wingspan), a body weight, a type of article clothing (e.g., a shirt, a jacket, a hat, pants, shorts), and/or a clothing color. In addition, the characteristics may include a group arrangement (e.g., relative positioning) determined by sets of individuals moving together throughout the queue area 62. However, the notable attributes may be similar or the same between other guests 58.

For instance, the notable attributes may or may not include more specific information, such as facial features or designs (e.g., printed designs) associated with articles of clothing. Thus, the guests 58 may remain sufficiently anonymous to avoid distinction of one particular guest 58 from other guests 58. In this manner, the sensors 80 may not need to capture sensitive, confidential, or personal information associated with the guests 58, depending on the desired monitoring context.

The controller 74 may monitor progression of various groups of guests 58 through the queue area 62 to determine the wait times. By way of example, the controller 74 may determine an approximate wait time associated with the first queue line 64 by monitoring a duration of time that a certain group of guests 58c may take to progress through the first queue line 64. The controller 74 may additionally or alternatively determine an approximate wait time associated with the second queue line 66 by monitoring a duration of time that a certain group of guests 58d may take to progress through the second queue line 66. To this end, the controller 74 may receive sensor data indicative of notable attributes associated with groups of guests 58 at different locations of the queue area 62. The controller 74 may compare the respective notable attributes indicated by the sensor data with one another and determine a confidence score (e.g., a confidence level, a confidence value) associated with a match between groups of guests 58 to indicate progression of those guests 58 through the queue area 62. The controller 74 may also operate a timer to determine a duration of time that elapsed between capture of different sensor data to indicate a duration of time related to progression of the guests 58 through the queue area 62.

For instance, the controller 74 may receive first sensor data that includes first notable attributes of guests 58 detected at a first location of the queue area 62, and the controller 74 may receive second sensor data that includes second notable attributes of guests 58 detected at a second location of the queue area 62. The controller 74 may compare the first notable attributes and the second notable attributes with one another to determine whether the first sensor data and the second sensor data likely indicates movement of the same guests 58 from the first location of the queue area 62 to the second location of the queue area 62. Indeed, because different groups of guests 58 may have a common notable attribute and/or because a notable attribute may change for a particular group of guests 58 while the particular group of guests 58 proceeds through the queue area 62, the controller 74 may verify whether respective notable attributes indicated by different sensor data may be associated with the same group of guests 58.

In an embodiment, the controller 74 may determine a confidence score and determine progress of one or more guests 58, or groups of guests 58 using the confidence score. In one example, the confidence score may be designated as high confidence if the confidence score is above a first threshold (e.g., a high confidence threshold). The confidence score may be designated as within a middle group of scores if below the first threshold but above a second confidence (e.g., a low confidence threshold). Middle group of scores between the first threshold and the second threshold (e.g., between the high confidence threshold and the low confidence threshold) may be flagged as discussed herein. The confidence score may be designated as low confidence if below the second threshold. By way of example only, the thresholds may be set such that a score of 80-100 is considered high confidence, a score of 60-79 is considered in a middle group, and a score of 0-59 is considered low confidence. However, it should be understood that other thresholds and ranges are also contemplated.

For example, a confidence score below a low confidence threshold may indicate that the second notable attributes are most likely not associated with the same guests 58 with which the first notable attributes are associated. High confidence scores may indicate that the first notable attributes and the second notable attributes are associated with the same guests 58. High confidence scores may trigger automatic consideration for the guest 58 or group of guests 58, and their associated tracking data, in a wait time determination calculation by the controller 74. Low confidence scores can trigger dropping associated tracking data. Scores in the middle group may trigger a flag for user input, which can then be used to prompt input from a user to recategorize the guests 58 into a high confidence group or a low confidence group, depending on the user assessment. The user input can additionally be used for machine learning to improve future categorization.

The controller 74 may then utilize the timer to determine a duration of time that elapsed between capture of the first sensor data and capture of the second sensor data. The duration of time may indicate an amount of time utilized by the guests 58 to progress from the first location of the queue area 62 to the second location of the queue area 62. The controller 74 may determine the wait time associated with the queue area 62 based on the duration of time.

In an embodiment, the controller 74 may receive sensor data from a first sensor 80A configured to provide sensor data indicative of notable attributes associated with the guests 58 entering the first queue line 64 at the first entrance 68. The controller 74 may also receive sensor data from a second sensor 80B configured to provide sensor data indicative of notable attributes associated with the guests 58 at the merge point 72. The controller 74 may further receive sensor data from a third sensor 80C configured to provide sensor data indicative of notable attributes associated with the guests 58 entering the second queue line 66 at the second entrance 70. Thus, the controller 74 may determine durations of time associated with progression from the first entrance 68 to the merge point 72 for the first queue line 64 and/or associated with progression from the second entrance 70 to the merge point 72 for the second queue line 66. Additionally or alternatively, the controller 74 may receive sensor data from a fourth sensor 80D configured to provide sensor data indicative of notable attributes associated with the guests 58 entering the loading/unloading station 60. In this way, the controller 74 may determine durations of time associated with progression from the merge point 72 to the loading/unloading station 60, from the first entrance 68 to the loading/unloading station 60, and/or from the second entrance 70 to the loading/unloading station 60.

Additionally or alternatively, when the system includes a third queue line 67, the controller 74 may receive sensor data from a fifth sensor 80E configured to provide sensor data indicative of notable attributes associated with the guests 58 entering the third queue line 67. The controller 74 may utilize any of such durations of time to determine a wait time associated with the first queue line 64, the second queue line 66, and/or the third queue line 67.

The controller 74 may also use other information to accurately determine a wait time. Indeed, although a determined duration of time may directly indicate a previous wait time for a group of guests 58 at a certain part of the queue area 62, the determined duration of time may not be indicative of a current wait time or a future wait time for other group of guests 58. As an example, the controller 74 may determine a parameter associated with operation of the ride 52, such as a rate in which the ride vehicle(s) 54 complete a circuit of the path 56, an operating mode of the ride 52, a time associated with loading/unloading operations in the loading/unloading station 60, and/or a quantity of guests 58 in a certain ride cycle of operation. As another example, the controller 74 may determine a parameter associated with the guest flow through the amusement park, such as a total quantity of guests 58 in the amusement park, a quantity of guests 58 in other attraction systems (e.g., an attraction system adjacent to the attraction system 50), a weather parameter (e.g., a rainy forecast may reduce a quantity of guests 58 who may want to partake in an outdoor ride), and/or a time of day (e.g., a quantity of guests 58 who are participating in rides may decrease during meal times). As a further example, the controller 74 may use historical information, such as previously determined wait times (e.g., associated with a similar time of day, operating mode, quantity of guests 58), to determine the wait time. Thus, the controller 74 may use multiple different information to determine a wait time more accurately.

The controller 74 may output a control signal based on the determined wait time. For example, the attraction system 50 may include a first display 82 that indicates the wait time associated with the first queue line 64. The first display 82 may be positioned adjacent to the first entrance 68 so that guests 58 who are at the first entrance 68 can determine whether to proceed to the first queue line 64 to wait for the ride 52 in the first queue line 64 based on the wait time provided by the first display 82. The attraction system 50 may also include a second display 84 that indicates the wait time associated with the second queue line 66. The second display 84 may be positioned adjacent to the second entrance 70 so that guests 58 who are at the second entrance 70) can determine whether to proceed to the second queue line 66 to wait for the ride 52 in the second queue line 66 based on the wait time provided by the second display 84. The attraction system 50 may also include a third display 85 that indicates the wait time associated with the third queue line 67. The third display 84 may be positioned adjacent to the third entrance 71 so that guests 58 who are at the third entrance 70 can determine whether to proceed to the third queue line 67 to wait for the ride 52 in the third queue line 67 based on the wait time provided by the third display 85. The controller 74 may output respective control signals to the displays 82, 84, 85 to update the wait times being provided. As an example, the controller 74 may output a control signal to instruct the first display 82 to update the wait time being provided based at least on a duration of time associated with progression from the first entrance 68 to the merge point 72, a duration of time associated with progression from the first entrance 68 to the loading/unloading station 60, and/or a duration of time associated with progression from the merge point 72 to the loading/unloading station 60. As another example, the controller 74 may output a control signal to instruct the second display 84 to update the wait time being provided based at least on a duration of time associated with progression from the second entrance 70 to the merge point 72, a duration of time associated with progression from the second entrance 70 to the loading/unloading station 60, and/or a duration of time associated with progression from the merge point 72 to the loading/unloading station 60. As another example, the controller 74 may output a control signal to instruct the third display 85 to update the wait time being provided based at least on a duration of time associated with progression from the third entrance 71 to the loading/unloading station 60. Thus, the wait times provided by the displays 82, 84, 85 may accurately represent the wait times for the guests 58 entering via the respective queue lines 64, 66, 67 via the entrances 68, 70, 71.

Additionally or alternatively, the controller 74 may output a control signal to instruct the ride 52 to adjust operations. As an example, in response to determining the wait time is above a threshold time, the controller 74 may instruct an additional ride vehicle 54 to operate, thereby enabling the ride 52 to accommodate additional guests 58 (e.g., to operate cycles of operation more frequently). As another example, the controller 74 may output a control signal to instruct the attraction system 50 to adjust operating modes, such as to operate the attraction system 50 in an operating mode having a duration of operation more suitable for the wait time (e.g., to operate the attraction system 50 in an operating mode having a relatively shorter duration of operation in response to determining the wait time is above a threshold time). As another example, the controller 74 may output a control signal to instruct the attraction system 50 to temporarily disable an online reservation system for the ride 52 while the wait time is above a threshold wait time.

The attraction system 50 may further include an interactive device 86 positioned at an intermediate location of the queue area 62 (e.g., between the entrances 68, 70, 71 and the loading/unloading station 60). The interactive device 86 may provide entertainment and/or information to guests 58 in the queue area 62. For example, the interactive device 86 may entertain the guests 58 in the queue area 62, such as by providing a show effect (e.g., a visual effect, such as a light, an audio effect, such as a sound). The controller 74 may operate the interactive device 86 based on a determined wait time. By way of example, the controller 74 may output a control signal to instruct the interactive device 86 to provide a certain show effect and/or to adjust a frequency that a show effect is provided based on the determined wait time. For example, if the interactive device 86 includes an interactive game, the controller 74 may instruct the interactive device 86 to refresh the interactive game more frequently or to add additional player capability to permit more people to play while in the queue area 62. Additionally or alternatively, the controller 74 may output a control signal to activate previously inactive interactive devices 86 in response to determining a wait time is above a threshold wait time. Furthermore, the controller 74 may output a control signal to adjust accessibility of different parts of the attraction system 50, such as to open a mechanical gate within the queue area 62 to permit guests 58 to access previously inaccessible parts (e.g., to increase a capacity in which the queue area 62 can accommodate guests) of the queue area 62, in response to determining a wait time is above a threshold wait time. When a wait time is determined to be below an additional threshold wait time, the controller 74 may output a control signal to revert to a previous state before the wait time was determined to be above the threshold wait time. Thus, the controller 74 may operate the interactive device 86 more suitably to entertain the guests 58 and potentially provide a better experience for the guests 58 in the queue area 62.

Additionally or alternatively, the interactive device 86 may provide a wait time to progress from the intermediate location of the interactive device 86 to the loading/unloading station 60. In other words, the interactive device 86 may provide the wait time to the guests 58 who are currently waiting in the queue area 62. Such guests 58 may utilize the wait time provided by the interactive device 86 to determine whether to remain in the queue area 62 or to exit the queue area 62 (e.g., in favor of going to a different attraction system). The controller 74 may output a control signal to instruct the interactive device 86 to update the wait time being provided based on various durations of time associated with progression between different locations of the queue area 62, thereby enabling the wait time provided by the interactive device 86 to accurately update guests 58 who are in the midst of waiting in the queue area 62.

Figure 2:
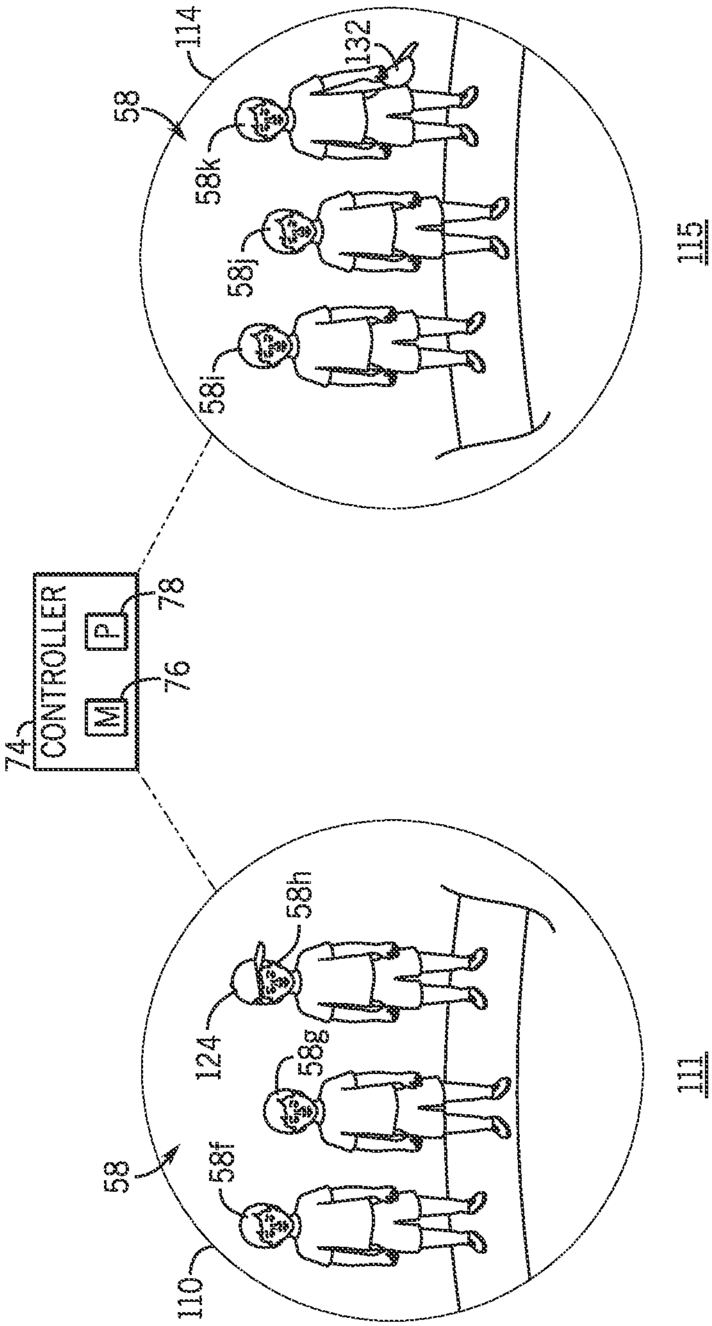
FIG. 2 is a schematic diagram illustrating operation of a controller configured to determine a wait time for an amusement park attraction system, in accordance with an aspect of the present disclosure.

FIG. 2 is a schematic diagram illustrating operation of the controller 74 to determine a wait time for an attraction system (e.g., the attractions system 50 of FIG. 1). The controller 74 may receive and store first sensor data 110 (e.g., transmitted by a first sensor) that indicates notable attributes for a first group 111 of guests 58 at a first location (e.g., an entrance) of a queue area (e.g., the queue area 62 of FIG. 1). The controller 74 may also receive and store second sensor data 114 (e.g., transmitted by a second sensor) that indicates notable attributes for a second group 115 of guests 58 at a second location (e.g., a merge point) of the queue area. For example, the first sensor data 110 and the second sensor data 114 may be received as captured image data, and the controller 74 may determine the respective notable attributes indicated by the sensor data 110, 114 based on the captured image data.

It should be noted that the groups 111, 115 of guests 58 may represent any collection of guests who may be waiting in the queue area. Indeed, the guests in each group 111, 115 of guests 58 may be of the same party in an embodiment. However, the guests in each group of guests 58 may be of different parties in an additional or alternative embodiment. Indeed, the guests 58 may be positioned (e.g., spaced apart) relative to one another in any suitable manner, the guests may have any suitable attributes, appearances, features, and/or characteristics, and/or the guests 58 may be waiting in the queue area at any suitable time of operation of the controller 74. Thus, the sensor data 110, 114 may be of any guest in the queue area to enable the controller 74 to determine a wait time at any point during operation. For this reason, the controller 74 may operate more readily to compare the notable attributes and determine a wait time instead of, for example, having to receive sensor data that includes a specific guest attribute (e.g., specific facial features) or otherwise satisfies specific criteria before being able to compare the sensor data with one another.

The controller 74 may compare the respective notable attributes indicated by the sensor data 110, 114 with one another to determine whether the notable attributes are associated with the same group of guests 58. In other words, the controller 74 may determine whether the first group 111 of guests 58 captured by the first sensor data 110 is the same as the second group 115 of guests 58 captured by the second sensor data 114. As an example, the controller 74 may determine the first sensor data 110 indicates or identifies first notable attributes that include a first guest **58*f* having a first height (e.g., a relatively taller height), a second guest 58*g* positioned adjacent to the first guest 58*f* and having a second height (e.g., a relatively shorter height), and a third guest 58***h* positioned adjacent to the second guest 58*g* and having a third height (e.g., an intermediate height). The controller 74 may also determine the first sensor data 110 indicates the third guest 58*h* is wearing first headwear 124 (e.g., a cap). The controller 74 may determine the second sensor data 114 indicates second notable attributes that include a fourth guest 58*i* having a fourth height (e.g., a relatively taller height), a fifth guest 58*j* positioned adjacent to the fourth guest 58*i* and having a fifth height (e.g., an intermediate height), and a sixth guest 58*k* positioned adjacent to the fifth guest 58*j* and having a sixth height (e.g., a relatively shorter height). The controller 74 may also determine the second sensor data 114 indicates the sixth guest 58*k* is holding second headwear 132 (e.g., a cap).

The controller 74 may compare the first notable attributes indicated by the first sensor data 110 with the second notable attributes indicated by the second sensor data 114 to determine whether the first group 111 of guests 58 and the second 115 group of guests 58 may be of the same group of guests. By way of example, the controller 74 may determine that the first height of the first guest 58*f* substantially matches the fourth height of the fourth guest 58*i*, the second height of the second guest 58*g* substantially matches the sixth height of the sixth guest 58*k*, and the third height of the third guest 58*h* substantially matches the fifth height of the fifth guest 58*j*. As such, the controller 74 may determine that the heights of the first group 111 of guests 58 substantially match the heights of the second group 115 of guests 58. The controller 74 may also determine that the first headwear 124 substantially matches the second headwear 132. The controller 74 may then determine a confidence score indicative of an extent in which the first group 111 of guests 58 and the second group 115 of guests 58 match one another.

In one embodiment, the controller 74 may determine the confidence score exceeds a threshold confidence score. For example, the controller 74 may determine that each of the first sensor data 110 and the second sensor data 114 includes common guest heights and common types of articles of clothing. For instance, the first guest 58*f* and the fourth guest 58*i* may be the same guest, the second guest 58*g* and the sixth guest 58*k* may be the same guest, and the third guest 58*h* and the fifth guest 58*j* may be the same guest. The controller 74 may determine that such sensor data 110, 114 indicating the same respective notable attributes may suggest that the first group 111 of guests 58 and the second group 115 of guests 58 match one another, even though the relative position of the guests 58*f*, 58*g*, 58*h* (e.g., the sequence of the guests 58*f*, 58*g*, 58*h*) in the first sensor data 110 may be different than the relative position of the guests 58*i*, 58*j*, 58*k* (e.g., the sequence of the guests 58*i*, 58*j*, 58*k*) in the second sensor data 114 and/or even though the headwear 124, 132 is possessed by a different guest 58*h*, 58*k* and in a different manner for the sensor data 110, 114. That is, the controller 74 may determine the first group 111 of guests 58 and the second group 115 of guests 58 are the same based on the sensor data 110, 114 indicating different permutations of the same respective notable attributes.

In response to determining the confidence score exceeds the threshold confidence score, the controller 74 may determine a duration of time between capture of the first sensor data 110 and the second sensor data 114. For example, the duration of time may indicate an amount of time elapsed for the guests 58*f*, 5*fi*, 58*h*, 58*i*, 58*j*, 58*k* to navigate from the first location associated with the first sensor data 110 to the second location associated with the second sensor data 114. In one embodiment, the controller 74 may determine a first time stamp associated with capture of the first sensor data 110 and a second time stamp associated with capture of the second sensor data 114. The controller 74 may determine the duration of time based on a difference between the first time stamp and the second time stamp. In an additional or alternative embodiment, the controller 74 may initiate a timer at the capture of the first sensor data 110 and pause the timer at the capture of the second sensor data 114, and the elapsed time provided by the timer may indicate the duration of time. The duration of time may further indicate an amount of time the guests 58*f*, 5*fi*, 58*h*, 58*i*, 58*j*, 58*k* may wait in the queue area. The controller 74 may therefore determine the wait time of the queue based on the duration of time, such as in conjunction with other information that may be received.

The controller 74 may alternatively determine the confidence score is below the threshold confidence score. By way of example, the different positioning of the guests 58*f*, 5*fi*, 58*h*, 58*i*, 58*j*, 58*k* (e.g., of corresponding guests having similar heights) and/or the different manners of possession of the headwear 124, 132 by different guests 58*h*, 58*k* in the sensor data 110, 114 may indicate that the first group 111 of guests 58 may be different from the second group 115 of guests 58. In response, the controller 74 may not determine a duration of time between capture of the first sensor data 110 and of the second sensor data 114. That is, the controller 74 may not determine a wait time based on comparison between the second sensor data 114 and the first sensor data 110.

However, in an embodiment, the controller 74 may continue to receive subsequent sensor data, determine notable attributes indicated by the subsequent sensor data, compare the notable attributes to the first notable attributes indicated by the first sensor data 110, and determine a confidence score based on the comparison. For example, the confidence score being below the threshold confidence score may indicate that the first group 111 of guests 58 have yet to pass the second location of the queue area. Thus, additional sensor data of the first group 111 of guests 58 at the second location may not have been received yet. The controller 74 may therefore continue to utilize the first sensor data 110 to determine a potential wait time. However, the controller 74 may eventually stop utilizing the first sensor data 110 to determine a potential wait time to avoid needlessly using the first sensor data 110. By way of example, the first group 111 of guests 58 may pass the second location of the queue area, but additional data of the first group 111 of guests 58 at the second location may not have been successfully captured or compared with the first sensor data 110. After the first group 111 of guests 58 passes the second location of the queue area, the first sensor data 110 may no longer be relevant for determining the wait time. For instance, the controller 74 may remove the first sensor data 110 from storage to reduce consumption of resources. In one embodiment, the controller 74 may remove the first sensor data 110 from storage after a threshold period of time (e.g., 6-12 hours, 12-24 hours, 1-3 days) has elapsed.

In an additional or alternative embodiment, the controller 74 may remove the first sensor data 110 from storage in response to determining a match between another (e.g., a subsequent) group of guests via different sensor data. For example, after receiving the first sensor data 110, the controller 74 may receive first subsequent sensor data associated with the first location of the queue area and indicating notable attributes of an additional group of guests. The controller 74 may also compare sensor data associated with the second location of the queue area with the first subsequent sensor data to determine whether the additional group of guests is identified at the second location. By way of example, the controller 74 may compare the second sensor data 114 to the first subsequent sensor data, determine a confidence score associated with the comparison, and determine that the second group 115 of guests 58 associated with the second sensor data 114 matches the additional group of guests associated with the first subsequent sensor data based on the confidence score exceeding a threshold confidence score. The controller 74 may remove the first sensor data 110 from storage in response, because the match between the second group 115 of guests 58 and the additional group of guests may indicate that the first group 111 of guests 58 may have already passed the second location. That is, because the capture of the first subsequent sensor data associated with the additional group of guests after capture of the first sensor data 110 associated with the first group 111 of guests 58 indicates the additional group of guests passing the first location of the queue area after the first group 111 of guests 58 passed the first location, the first group 111 of guests 58 may remain ahead of the additional group of guests throughout the queue area. Thus, after the additional group of guests (e.g., and presumably the first group 111 of guests 58) pass the second location, no subsequent sensor data may indicate the first group 111 of guests 58 passing the second location. As such, the first sensor data 110 may no longer be usable for monitoring progression of the first group 111 of guests 58 and may therefore be removed from storage. Removal of the first sensor data 110 may provide availability of resources used to receive additional sensor data and monitor progression of additional groups of guests for determining a wait time.

In an additional or alternative embodiment, the second sensor data 114 may be used to update the first sensor data 110 instead of being used to determine a duration of time associated with progression from the first location to the second location. For example, the second sensor data 114 may be intermediate sensor data (e.g., sensor data received before subsequent sensor data used to determine the wait time) that may be used to verify progression of a group of guests. Based on the confidence score associated with comparison between the first sensor data 110 and the second sensor data 114 being above the threshold confidence score, thereby indicating progression of guests from the first location to the second location, the controller 74 may update the first sensor data 110 to indicate the notable attributes of the second sensor data 114. Indeed, the notable attributes of the second sensor data 114 may more accurately represent the guests as the guests progress through the queue area. For example, the positioning of the guests may adjust and/or the articles of clothing (e.g., the headwear 124, 132) possessed by the guests may adjust as the guests progress through the queue area. Thus, updating the first sensor data 110 may enable the first sensor data 110 to be more accurately used for comparison to identify the guests for additional sensor data. That is, the controller 74 may compare subsequent notable attributes indicated by subsequent sensor data with the notable attributes indicated by the second sensor data 114 instead of with the notable attributes indicated by the first sensor data 110. Accordingly, the controller 74 may accommodate potential changes in the notable attributes of guests during progression of the queue area, such as changes of clothes, changes in relative positioning of guests, and so forth, and enable more accurate identification of the guests. As such, a wait time may be more accurately determined based on the first sensor data 110 as updated in view of the second sensor data 114.

Each of FIGS. 3-6 is a flowchart of a method for operating an attraction system (e.g., the attraction system 50 of FIG. 1) and with reference to features discussed in FIGS. 1 and 2. Any suitable device (e.g., a device including the processor 78 of FIGS. 1 and 2) may perform each method. In one embodiment, the methods may be implemented by executing instructions stored in a tangible, non-transitory, computer-readable medium (e.g., the memory 76 of the controller 74 of FIGS. 1 and 2). For example, each method may be performed at least in part by one or more software components, one or more software applications, and the like. While each method is described as having operations performed in a specific sequence, additional operations may be performed, the described operations may be performed in a different sequence than the sequence illustrated, and/or certain described operations may be skipped or not performed altogether. Additionally, the operation of each method may be performed in any manner with respect to one another, such as sequentially and/or at the same time.

Figure 3:
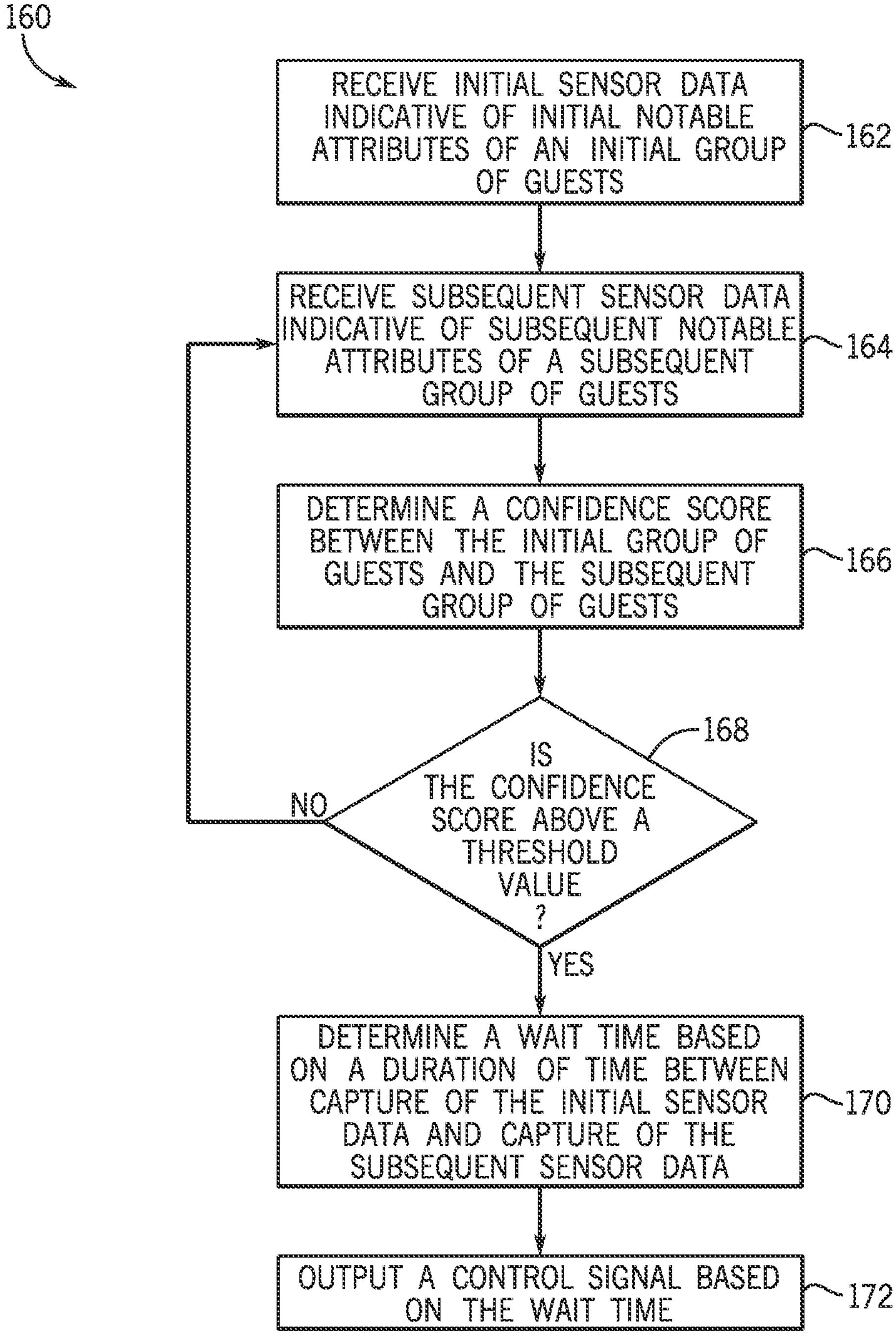
FIG. 3 is a flowchart of an embodiment of a method for determining a wait time for an amusement park attraction system, in accordance with an aspect of the present disclosure.

FIG. 3 is a flowchart of a method 160 for determining a wait time for a queue area of an attraction system. At block 162, initial sensor data indicative of initial notable attributes of an initial group of guests may be received and stored. The initial sensor data may be received from a first sensor and may be associated with a first location of the queue area, such as an entrance or other suitable upstream location. As an example, the initial sensor data may include captured imagery (e.g., still and/or video image data, real-time image data), machine vision, and/or position data associated with the initial group of guests. The initial notable attributes may include initial values associated with a body dimension, a body weight, a type of clothing, and/or a clothing color of the guests included in the initial group of guests.

At block 164, subsequent sensor data indicative of subsequent notable attributes of a subsequent group of guests may be received and stored. The subsequent sensor data may be received from a second sensor and may be associated with a second location of the queue area, such as a merge point (e.g., between multiple queue lines), a loading/unloading station, or another suitable downstream location. The subsequent sensor data may include captured imagery, machine vision, and/or position data associated with the subsequent group of guests. The subsequent notable attributes may include subsequent values associated with a body dimension. (e.g., a height), a type of clothing being worn, tattoos, jewelry, clothing patterns, hair color, type of clothing (short sleeve vs long sleeve, hooded, button down, zippers, etc.), color of clothing, symbols, accessories (like purses, backpacks, sunglasses, glasses fanny pack)

At block 166, a confidence score indicative of an extent in which the initial group of guests and the subsequent group of guests match one another may be determined. For example, a high confidence score may indicate a higher likelihood that the initial group of guests and the subsequent group of guests are of the same guests. The initial sensor data and the subsequent sensor data may be compared with one another to determine the confidence score. For instance, in response to receipt of the subsequent sensor data, the initial sensor data may be retrieved from storage for comparison. During the comparison between the initial sensor data and the subsequent sensor data, the initial notable attributes indicated by the initial sensor data and the subsequent notable attributes indicated by the subsequent sensor data may be compared with one another to determine the confidence score. By way of example, similarities between the initial values of the initial notable attributes and the subsequent values of the notable attributes may be determined. The confidence score may be determined based on the similarities, such as using a regression (e.g., a linear regression) module and/or a machine learning algorithm for predictive models.

At block 168, the confidence score is compared to a threshold value. The threshold value may be associated with a minimum allowable threshold value that indicates the initial group of guests and the subsequent group of guests are of the same guests. In response to a determination that the confidence score is not above the threshold value, no further action may be performed. For example, a control signal may be blocked from being output in response to the determination that the confidence score is not above the threshold value. That is, the confidence score being at or below the threshold value may indicate that the initial group of guests and the subsequent group of guests are not of the same guests. Therefore, the subsequent group of guests may not be associated with the initial group of guests and may not indicate progression of the initial group of guests from the first location to the second location of the queue area.

However, in response to a determination that the confidence score is above the threshold value, at block 170, a wait time may be determined based on a duration of time between capture of the initial sensor data and capture of the subsequent sensor data. That is, the confidence score being above the threshold value may indicate that the initial group of guests and the subsequent group of guests are of the same guests and may indicate progression of the initial group of guests from the first location to the second location. As such, the duration of time between capture of the initial sensor data and capture of the subsequent sensor data may indicate an amount of time elapsed for the guests to progress from the first location to the second location. In an embodiment, the duration of time may be determined based on a difference between respective time stamps associated with the capture of the initial sensor data and the capture of the subsequent sensor data. In an additional or alternative embodiment, the duration of time may be determined based on operation of a timer.

The illustrated example may use an up/down determination using a single threshold comparison to determine whether a score is high confidence or low confidence. However, as discussed herein, additional thresholds may separate out high, middle, and low confidence scores, which may trigger different actions. A high confidence score can proceed to block 170, a low confidence score can iterate back to block 164, and a middle score can generate a prompt for user input and/or to collect additional data.

At block 172, a control signal may be output based on the determined wait time. As an example, the control signal may instruct a display to update presentation of a wait time (e.g., to guests at an entrance of the attraction system). As another example, the control signal may provide a notification to a user, such as an operator, a guest, a technician, and so forth, to inform the use of the wait time. For instance, based on the notification, the user (e.g., a worker of the attraction system) may adjust operations, such as to adjust guest flow at a merge point (e.g., to change flow of guests from a secondary queue line to a primary queue line), to adjust the loading/unloading operation being performed at the loading/unloading station, or otherwise adjust progression of guests through the queue area. As a further example, the control signal may instruct adjustment of an operation of the attraction system, such as to adjust a component (e.g., an interactive device, show effects) used to entertain guests in the queue area, to adjust a frequency in which the attraction system operates to entertain guests, and the like. Thus, the control signal may update operation of the attraction system based on the determined wait time.

The method 160 may be continually performed during operation of the attraction system. By way of example, sensor data of the first location may be continually received and compared with sensor data of the second location. For instance, sensor data may be captured at a pre-determined frequency, such as once every one to ten minutes, once every ten to thirty minutes, or multiple times per minute. Additionally or alternatively, the sensor data may be captured based on different criteria, such as for a particular type of the attraction system (e.g., a ride, a theatrical performance), a layout of the queue area (e.g., a quantity of merge points, a length of the queue lines), and/or a quantity of guests in the attraction system and/or in the amusement park. Respective notable attributes may also be continually compared with one another to determine a confidence score for determining a potential wait time. Frequent performance of the method 160 may enable a duration of time associated with progression of guests to be determined more frequently. Thus, a more accurate wait time may be determined. As an example, multiple wait times may be determined, and the wait times may be compared with one another to determine an accuracy of a wait time. Indeed, a determined wait time that is substantially different from other determined wait times (e.g., a previously determined wait time) may be inaccurate and therefore may not be used to output a control signal to avoid operating the attraction system in an undesirable manner (e.g., based on an inaccurately determined wait time).

In an embodiment, the notable attributes may be identified out of a set of potential notable attributes. For example, presence of a hat may be a potential notable attribute. Thus, a group of guests may be selected for capture via sensor data based on the presence of a hat in the group of guests to enable increased likelihood of discernment of the group of guests from other group of guests. As such, selection of a group of guests based on the presence of a particular notable attribute in the group of guests may enable the progress of the group of guests through the guest area to be monitored more effectively or accurately. Indeed, some groups may not have a presence of the potential notable attribute of interest (e.g., no guest in the group may wear a hat), and such groups may therefore be more difficult to discern from other groups of guests. Thus, such groups may not be selected for capture via sensor data. Further, multiple guests may have similar notable attributes (e.g., wearing the same colored shirt and pants, be of the same height) throughout the queue area. As such, certain notable attributes may not be sufficiently distinguishing. In such cases, a particular group of guests having such notable attributes may not be easily discernible from other groups of guests and may therefore be a poor candidate for usage to determine a wait time. For this reason, that group of guests may not be selected for capturing sensor data or captured sensor data related to the group of guests can be discarded for determining a wait time.

In an embodiment, individuals or groups can be ranked based on the notable attributes, and a subset of the identified individuals or groups having a sufficiently high rank may be selected for determining a wait time. In other words, individuals or groups that have a higher distinguishability from other individuals or groups may be selected based on the notable attributes for determining wait times. For example, image data may be received, and individuals or groups that are most different may be determined from the image data based on a machine learning algorithm that uses a set of potential notable attributes. The most different individuals and/or groups may be ranked highest.

Further still, the progression of different groups of guests through different regions of a queue area may be monitored, and a wait time may be determined based on the respective progressions through the different regions. In one example, an individual guest may be wearing a highly distinguishing hat shaped like a fruit basket. The individual guest (e.g., a group of guests including the individual guest) may be selected to determine a progress of the individual guest at a first region of the queue area that may be local to the selected individual guest. A group of guests that may be wearing highly distinguishing bright orange skirts may be selected to determine a progress of the group of guests at a second region of the queue that may be local to the selected group of guests. An overall wait time may then be determined based on the local progress at the respective first region and second region of the queue area. For example, an equation that associates an overall wait time with different durations of time to progress at respective regions of the queue area may be used to determine wait time on a rolling basis (e.g., as updated information regarding the durations of time is received).

Figure 4:
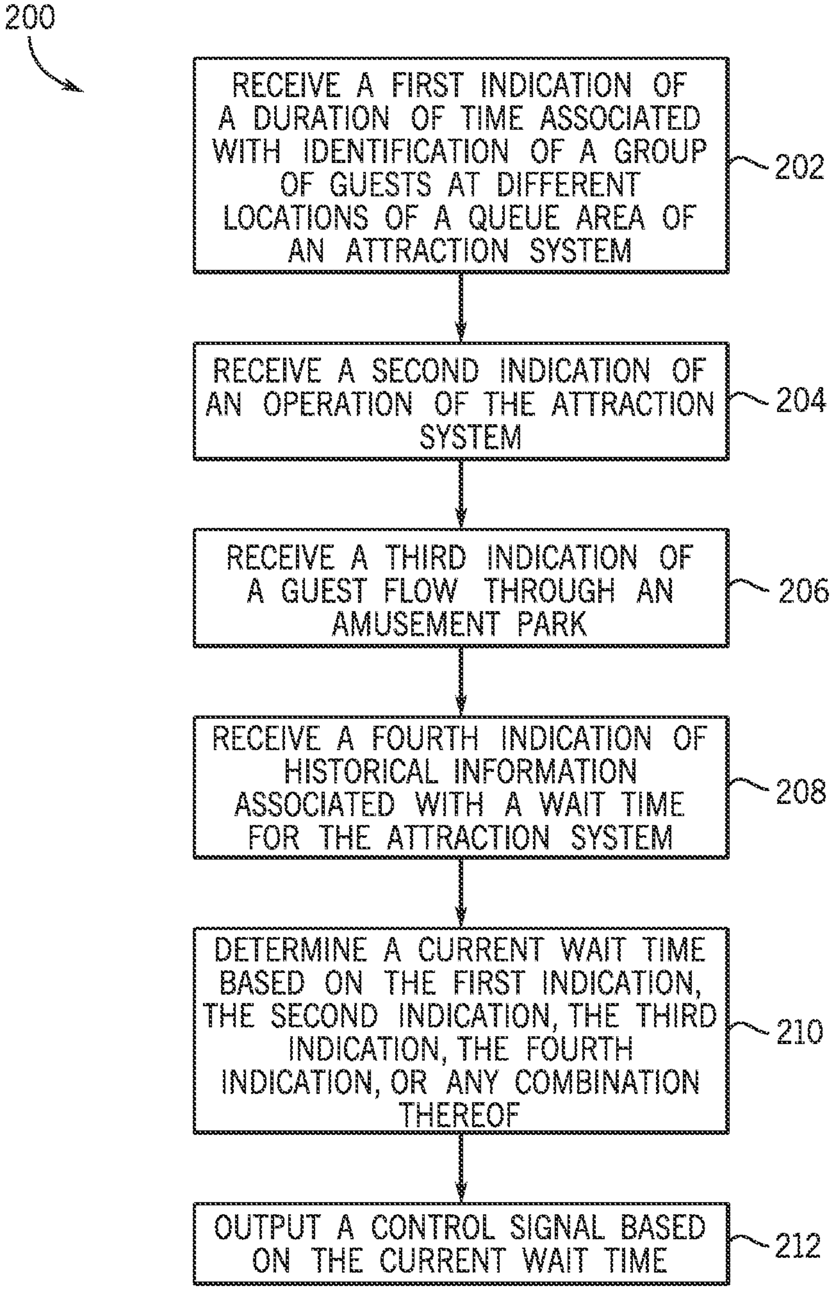
FIG. 4 is a flowchart of an embodiment of a method for determining a wait time for an amusement park attraction system, in accordance with an aspect of the present disclosure.

FIG. 4 is a flowchart of an embodiment of a method 200 for determining a wait time for a queue area of an attraction system. At block 202, a first indication of a duration of time associated with identification of a group of guests at different locations of the queue area may be received and stored. By way of example, the first indication may be received by performing the method 160 of FIG. 3. That is, respective sensor data indicative of notable attributes of groups of guests at different locations of the queue area may be received, and the notable attributes of the respective sensor data may be compared with one another to determine a confidence score. The respective groups of guests associated with the sensor data may be determined to be of the same guests in response to a determination that the confidence score exceeds a threshold value, and a duration of time between capture of the respective sensor data may be determined as the first indication. The first indication may be associated with progression of the group of guests from a first location to a second location of the queue area and may therefore directly indicate a wait time associated with the group of guests.

At block 204, a second indication of an operation of the attraction system may be received and stored. The second indication may be received via sensor data and/or user input. As an example, the second indication may include a rate in which the attraction system receives guests from the queue area, such as a completion time of a cycle of operation of the attraction system (e.g., a rate in which a ride vehicle of the attraction system completes a circuit). Thus, the second indication may be associated with how quickly the attraction system may accommodate additional guests that are waiting in the queue area. By way of example, the second indication may include an operating mode of the attraction system, a loading/unloading time of operation, a number of ride vehicles in operation, another suitable parameter, or any combination thereof.

At block 206, a third indication of a guest flow through the amusement park may be received and stored. The third indication may also be received via sensor data and/or user input. The third indication may include, for instance, a total quantity of guests in the amusement park, a quantity of guests in other attraction systems (e.g., an adjacent attraction system), a wait time associated with other attraction systems (e.g., an adjacent attraction system), a weather parameter, a time of day, and so forth. The third indication may provide an indication regarding potential flow of guests to the attraction system to affect the wait time.

At block 208, a fourth indication of historical information may be received and stored. The historical information may include a previously determined wait time, such as a wait time previously determined on the same day (e.g., a most recently determined wait time) and/or a wait time determined on a different day (e.g., a wait time determined at the same time of day for a different day). The historical information may indicate a trend or pattern of wait times that may be used to determine a more accurate current wait time.

At block 210, a current wait time may be determined based on the first indication, the second indication, the third indication, the fourth indication, or any combination thereof. As an example, the current wait time may indicate a duration of time elapsed for a guest to progress from an entrance of the queue area to a loading/unloading station and/or to a ride vehicle of the attraction system. As another example, the current wait time may indicate a duration of time elapsed for a guest to progress from an intermediate location of the queue area to the loading/unloading station and/or to the ride vehicle.

At block 212, a control signal may be output based on the current wait time. The control signal may instruct a display to adjust a wait time being presented, provide a notification to a user, and/or otherwise instruct operation of the attraction system to adjust. As such, the attraction system may be more suitably operated based on the determined current wait time.

Figure 5:
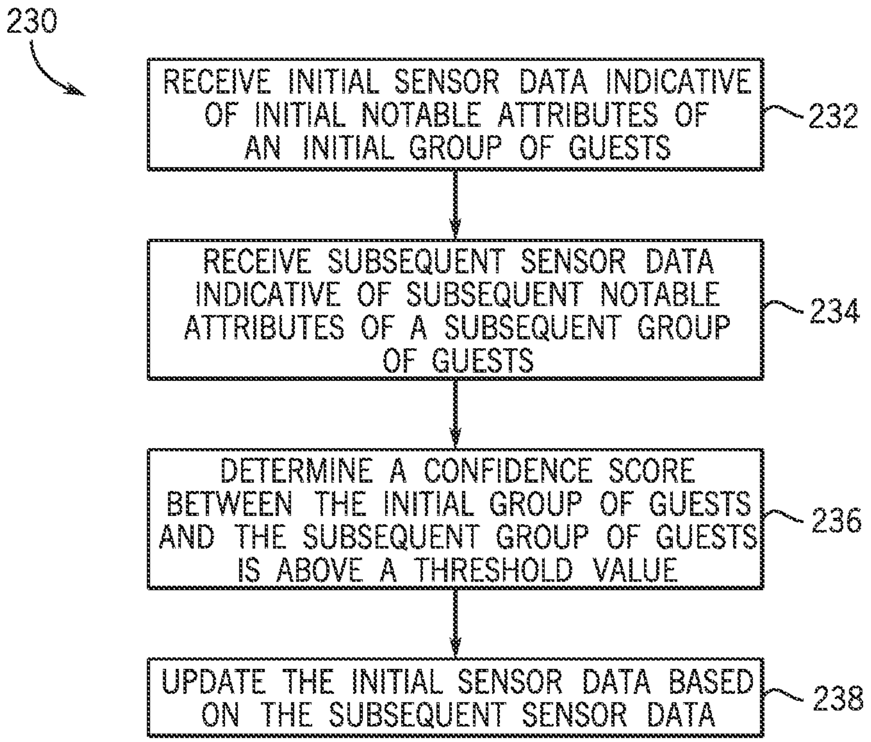
FIG. 5 is a flowchart of an embodiment of a method for updating sensor data used to determine a wait time for an amusement park attraction system, in accordance with an aspect of the present disclosure.

FIG. 5 is a flowchart of an embodiment of a method 230 for updating sensor data used to determine a wait time for an attraction system. At block 232, initial sensor data indicative of initial notable attributes of an initial group of guests may be received and stored. At block 234, subsequent sensor data indicative of subsequent notable attributes of a subsequent group of guests may be received and stored. For example, the initial sensor data and/or the subsequent sensor data may be received using the techniques discussed with respect to blocks 162, 164 of FIG. 3. The initial sensor data may be associated with a first location of the queue area of the attraction system, and the subsequent sensor data may be associated with a second location of the queue area.

At block 236, a confidence score indicative of a match between the initial group of guests and the subsequent group of guests may be determined and compared to a threshold value, such as using the techniques discussed with respect to blocks 166, 168 of FIG. 3. The confidence score may be determined to exceed the threshold value to indicate that the initial group of guests and the subsequent group of guests are of the same guests. Thus, the subsequent sensor data may indicate passing of the group of guests from the first location to the second location of the queue area.

At block 238, the initial sensor data may be updated based on the subsequent sensor data. For example, the subsequent sensor data may be an updated representation of the group of guests. Therefore, the subsequent notable attributes indicated by the subsequent sensor data may more accurately represent the group of guests and should be used as comparison to determine progression of the group of guests through the queue area. Thus, the initial sensor data may be updated to include the subsequent notable attributes indicated by the subsequent sensor data. As such, additional sensor data may be received, and additional notable attributes indicated by the additional sensor may be compared to the subsequent notable attributes instead of to the initial notable attributes to enable a more accurate comparison for identifying the group of guests at another location of the queue area. As such, updating the initial sensor data may enable progression of the group of guests to be more accurately identified and to enable a wait time to be more accurately determined.

Figure 6:
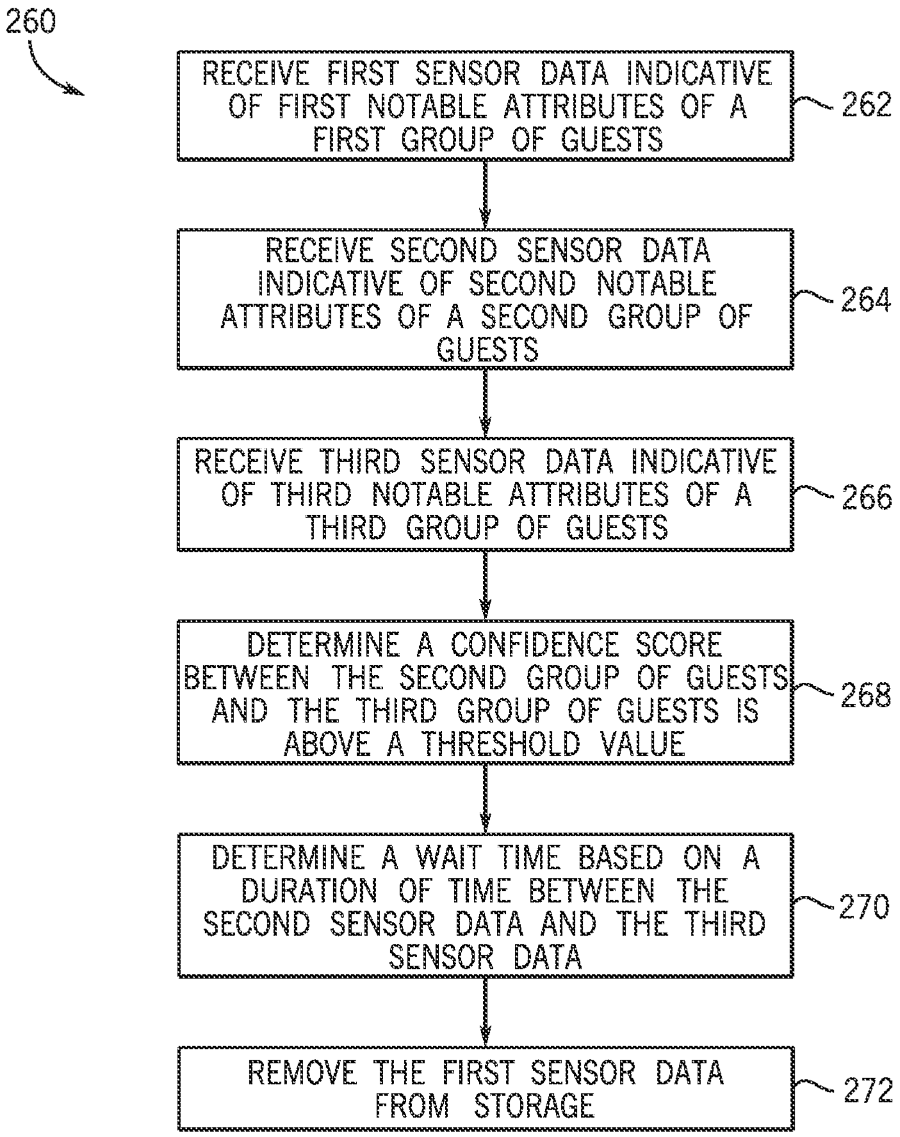
FIG. 6 is a flowchart of an embodiment of a method for determining a wait time for an amusement park attraction system, in accordance with an aspect of the present disclosure.

FIG. 6 is a flowchart of an embodiment of a method 260 for determining a wait time of an attraction system. At block 262, first sensor data indicative of first notable attributes of a first group of guests may be received and stored. The first sensor data may be associated with a first location of a queue area of the attraction system. At block 264, after receipt of the first sensor data, second sensor data indicative of second notable attributes of a second group of guests, different from the first group of guests, may be received and stored. The second sensor data may also be associated with the first location of the queue area. The first sensor data may indicate the first group of guests passing the first location, and the second sensor data may indicate the second group of guests passing the first location after the first group of guests have passed the first location. In this manner, the first group of guests may be ahead of the second group of guests while each group of guests wait in the queue area.

At block 266, third sensor data indicative of third notable attributes of a third group of guests may be received and stored. The third sensor data may be associated with a second location of the queue area, such as a merge point or a loading/unloading station. The third sensor data may be compared with the first sensor data and/or with the second sensor data. That is, the third notable attributes indicated by the third sensor data may be compared with the first notable attributes indicated by the first sensor data, and/or the third notable attributes indicated by the third sensor data may be compared with the second notable attributes indicated by the second sensor data. A respective confidence score may then be determined based on the comparisons to determine whether the third group of guests match the first group of guests or the second group of guests.

At block 268, the confidence score indicative of an extent in which the second group of guests and the third group of guests match one another is determined to be above a threshold value. In this way, the third sensor data may indicate the second group of guests passing the second location. For this reason, at block 270, a wait time may be determined based on a duration of time between capture of the second sensor data and of the third sensor data. The duration of time may indicate an amount of time elapsed for the second group of guests to progress from the first location to the second location. Thus, the duration of time may be used to determine the wait time associated with the queue area.

At block 272, the first sensor data may be removed from storage in response to determination that the confidence score between the second group of guests and the third group of guests is above the threshold value. By way of example, because the first group of guests is presumed to remain ahead of the second group of guests in the queue area based on receipt of the first sensor data before receipt of the second sensor data, the first group of guests would pass the second location before the second group of guests pass the second location. Thus, the confidence score being above the threshold value and indicating that the second group of guests passed the second location may also indicate that the first group of guests have already passed the second location. For this reason, additional sensor data that indicates the notable attributes of the first group of guests may no longer be received. That is, the first group of guests may no longer be identified by any subsequent sensor data after the third sensor data indicative of the third group of guests has been received. As an example, the first group of guests may have passed the second location without being identified by any sensor data associated with the second location. Therefore, the first sensor data may no longer be used to determine an amount of time elapsed for the first group of guests to progress from the first location to the second location. In other words, the first sensor data may no longer be relevant for determining a wait time. As such, the first sensor data may be removed from storage to reduce resource consumption associated with management of the first sensor data, such as an amount of storage space used to store the first sensor data. Thus, operations to determine a wait time may be performed more efficiently.

Certain embodiments of the disclosure track groups of guests, as generally discussed herein, to estimate wait times. Thus, in certain embodiments, a group of guests 58 in a queue used to track wait times for that queue may be referred to as a wait time group. The wait time group may include guests with individuals that may or may not be family groups or that even know one another. For example, a wait time group of three people near one another in line may or may not know each other. However, that group of three people may be usefully grouped together in a wait time group for the purposes of tracking their progress through a line based on their combination of their notable attributes. In certain embodiments, the system may additionally or alternatively identify or classify groups of guests into riding groups based on a likelihood that the guests know one another and will wish to be seated together in a ride vehicle. A wait time group and a riding group may or may not overlap. Stated another way, a tracked group may include some or all of a riding group. For example, a wait time group may include fewer guests relative to a riding group, because the system may be able to estimate wait times with sufficient accuracy and more efficiently selecting fewer guests with more distinguishing notable attributes from a pool of potential guests in a local area. However, because riding groups are self-sorting, an individual riding group may have six, seven, or even more guests 58, which may be more guests than necessary for efficient wait time tracking.

Figure 7:
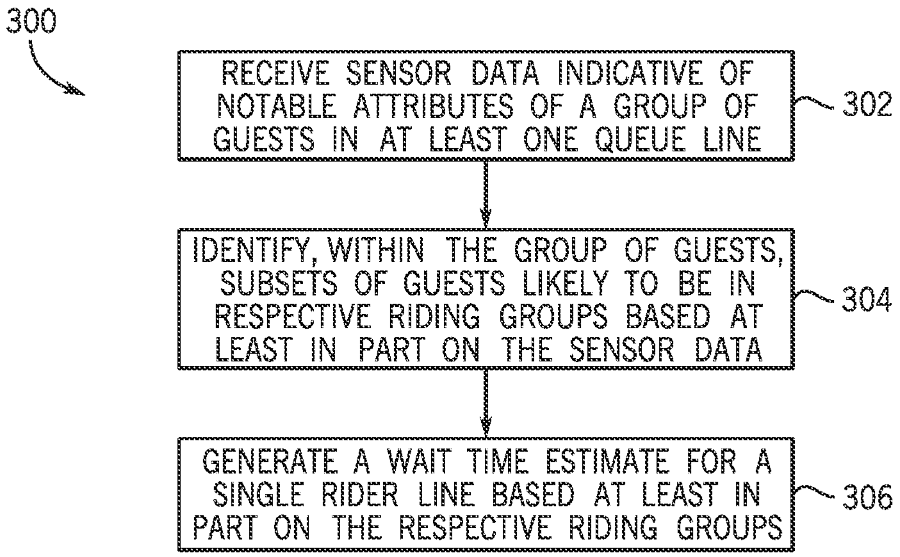
FIG. 7 is a flowchart of an embodiment of a method for determining single rider wait times, in accordance with an aspect of the present disclosure.

FIG. 7 is a flow diagram of a process 300 for identifying riding groups and using the identified riding groups to, as in the illustrated embodiment, estimate wait times. The system 50 may receive sensor data as generally disclosed herein that is indicative of notable attributes of guests in at least one queue line at block 302. For example, the at least one queue line may be a first queue line 64, a second queue line 66, and/or a merged queue line or loading area. Based on the notable attributes, the guests may be tracked to estimate throughput within the queue line. Additionally or alternatively, the system 50 may identify riding groups that refer to groups of guests 58 that are likely to wish to sit together on a ride vehicle 54 at block 304.

In an embodiment, the riding groups may be identified based on the notable attributes indicated by the sensor data. For example, a notable attribute may include matching shirts, matching hats, or other matching wearable items. A group of guests 58 having matching wearable items may be preliminarily identified as a riding group. In an embodiment, the riding groups may be identified based on other data sources, such as guests who scanned in together at an attraction entrance or guests who have self-identified as being part of a family group via guest profile information or linked accounts. At the time of scan in, biometric data (e.g., facial features, fingerprint) may be captured to track guests in a riding group throughout a queue line. In an embodiment, riding groups may be identified based on operator or user input (e.g., scanning in together, providing a group number to an operator interface or at a guest interface at the queue line). In one example, users can stand together at a designated area to be scanned as a riding group. In another example, an operator can provide input to a user interface identifying users as a riding group by scanning user profile information from guest mobile devices or by inputting a total guest number for each group as they pass by. The input may, in embodiments, be a group photo from which notable attributes can be extracted and subsequently tracked using sensor data captured in the queue line. In an embodiment, riding groups may be identified based on data captured within the amusement park to identify guests who have participated in other activities together, such as eating at a restaurant or riding other attractions together. These features may be used to generate a confidence score, as generally discussed herein with respect to wait time groups. High confidence scores above a threshold may automatically pass through as identified riding groups, while a middle band may be flagged for operator input, and a low confidence score may be automatically rejected.

In an embodiment, an attraction may include a single rider line (e.g., the third queue line 67, see FIG. 1) that merges with one or more other queues, e.g., at the loading area. Data from the one or more other queues may be used to estimate the wait for a single rider line at block 306 by identifying riding groups and estimating, based on the tracked riding groups, a ride vehicle filling arrangement that would leave empty seats. When groups near each other in the queue cannot fill the ride vehicle, single rider(s) will be used. Thus, the ride vehicle filling model logic can use inputs of numbers of guests together in groups and total number of guests to determine if a single rider will be needed and/or to determine a number of single rider seats in a ride vehicle. Thus, the wait time in a single rider line is a function of an estimated number of available single rider seats. Groups may be identified as provided herein and based on tracking information from within the queue (e.g., guests who stand near or talk with one another) as well as tracking data from before entering the queue.

In an embodiment, the identified and tracked groups are used to propose or estimate ride vehicle loading arrangements. For example, the controller 74 may use a riding group logic to estimate how different groups are likely to fill seats in a ride vehicle and to identify available single rider seats. A ride vehicle filling model can intake information for a subset of guests present in a loading or queue area. Based on the collected data identifying different tracked groups, the guests can be identified as groups of two, three, four, five, etc.

In one example, a ride may be arranged such that each ride vehicle has eight total seats. Thus, each ride vehicle may be filled with two groups of four, a group of five and a group of three, a group of six and a group of two, etc. If a group of seven is identified, that group is likely to leave an empty seat, and that likely empty seat can be flagged as a potential seat available to a rider in a single rider line. Similarly, a group of five that is seated with a group of two is also likely to leave an empty seat available to a rider in a single rider line.

In another example, individual seats may be four across, but a group of three guests 58 are likely to leave an empty seat. The likely empty seat can be flagged as a potential seat available to a rider in a single rider line to track estimated wait time for both conventional lines as well as specialty lines, such as the single rider line. In this manner, a guest can be provided (e.g., via a push notification or a display) with estimated wait times for both a conventional line and a single rider line to determine if the single rider line is likely to be faster or slower than the conventional line.

The ride vehicle filling model can generate a proposed grouping for each ride vehicle in real time and based on ride vehicle arrangement and capacity. The proposed ride filing by the available groups of guests can be fed to an operator interface to provide guidance for directing different groups to different ride vehicles. Because loading areas can be somewhat less organized than a queue (e.g., with guests clumped together rather than in an orderly queue), the guidance may assist operators to identify guests who are in a tracked group from within a larger group of guests clustered together. In an embodiment, the interface may be an AR interface that overlays a designation for an identified group to assist identification. The ride filling model may also use logic based on ride capacity and ride characteristics (e.g., age/height limits) to identify members of a group who are likely to utilize child swap options. In addition, the ride filling model may identify children who are likely to wish to be seated next to parents and any missing group members (e.g., if a guest is in the restroom) who are likely to return before the ride is loaded.

In an embodiment, the riding group logic may identify, within a proposed riding group, members that are accompanying the group through the queue line but who are likely not going to board the ride vehicle as riders. Thus, an identified riding group may include non-participating members. For example, non-participating members may be tracked with the riding group but not considered in a ride vehicle loading arrangement. In one example, these members may self-identify at the ride entrance. In an embodiment, these members may be identified via sensor data. In an embodiment, the sensor data may identify a guest carrying bags of the group as a likely non-participating member in cases in which guests are not permitted to bring bags on the ride vehicle. In an embodiment, a non-participating member may be estimated to be too young for the ride, and another member of the riding group may also be considered to be a caretaker for the purposes of a child swap arrangement. In another example, the amusement park may have specialized guides who are determined to be non-participating members, and these guides may be identified by a particular clothing item or identifying accessory that is resolvable in sensor data.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. An amusement park attraction system, comprising:

a queue area; and a controller configured to:

receive first sensor data, the first sensor data comprising image data, at a first location in the queue area, indicative of one or more notable attributes associated with guests in the queue area, wherein the notable attributes comprise clothing attributes;

identify the associated notable attributes of the guests at the first location using the first sensor data;

identify a plurality of groups of two or more of the guests that are near one another in the queue area based on a combination of the identified notable attributes of the two or more guests;

rank the combination of identified notable attributes of each group of the plurality of groups based on distinguishability;

select a group of the two or more guests from the plurality of groups based on the ranking of the combination of identified notable attributes of each group;

receive second sensor data, the second sensor data comprising image data at a second location in the queue area, wherein the second sensor data is indicative of the one or more notable attributes associated with the guests in the queue area;

identify the combination of notable attributes using the second sensor data to track movement of the group of the two or more guests from the first location to the second location;

determine a duration of time between the identified group of two or more guests moving from the first location to the second location; and adjust an operating mode of an attraction to have a shorter duration of operation based on the duration of time exceeding a threshold duration of time.

2. The amusement park attraction system of claim 1, wherein the controller is configured to:

determine a wait time associated with the queue area based on the duration of time; and output a control signal based on the wait time.

3. The amusement park attraction system of claim 2, comprising a display, wherein the controller is configured to output the control signal to instruct the display to provide an image based on the wait time.

4. The amusement park attraction system of claim 3, wherein the queue area comprises an interactive device different from the display, and the controller is configured to output the control signal to instruct the interactive device to output an interactive visual effect, an interactive audio effect, or both based on the wait time.

5. The amusement park attraction system of claim 1, comprising:

a first sensor configured to detect the group of two or more of the guests at the first location of the queue area and transmit the first sensor data to the controller; and a second sensor configured to detect the group of two or more of the guests at the second location of the queue area and transmit the second sensor data to the controller.

6. The amusement park attraction system of claim 1, wherein the clothing attributes comprise one or more types of articles of clothing, one or more colors of clothing, clothing patterns, or any combination thereof.

7. A non-transitory computer-readable medium comprising instructions that, when executed by a processor, are configured to cause the processor to:

receive a plurality of sensor data indicative of one or more notable attributes associated with respective groups of guests in a queue area of an amusement park attraction system;

rank each respective group of guests based on distinguishability of the one or more notable attributes associated with each respective group of guests;

select a group of guests based on the ranking of each respective group of guests;

compare first sensor data of the plurality of sensor data of the group of guests with second sensor data of the plurality of sensor data;

determine a confidence score associated with the comparison between the first sensor data of the plurality of sensor data and the second sensor data of the plurality of sensor data exceeds one or more threshold values;

determine a duration of time between capture of the first sensor data of the plurality of sensor data and of the second sensor data of the plurality of sensor data; and output a control signal based on the duration of time, wherein the control signal instructs an additional ride vehicle to operate in response to the duration of time exceeding a threshold time.

8. The non-transitory computer-readable medium of claim 7, wherein the instructions, when executed by the processor, are configured to cause the processor to:

determine a wait time associated with the queue area based on the duration of time; and output the control signal based on the wait time.

9. The non-transitory computer-readable medium of claim 8, wherein the instructions, when executed by the processor, are configured to cause the processor to:

receive a first indication of an operation of the amusement park attraction system;

receive a second indication of a guest flow;

receive a third indication of a previously determined wait time of the amusement park attraction system; and determine the wait time based on the first indication, the second indication, the third indication, or any combination thereof in addition to the duration of time between the capture of the first sensor data and of the second sensor data.

10. The non-transitory computer-readable medium of claim 8, wherein the instructions, when executed by the processor, are configured to cause the processor to:

identify at least one riding group of the respective groups of guests; and generate instructions to load a ride vehicle based on the identified at least one riding group.

11. The non-transitory computer-readable medium of claim 7, wherein the instructions, when executed by the processor, are configured to cause the processor to:

receive and store initial sensor data of the plurality of sensor data;

receive the first sensor data after receiving and storing the initial sensor data; and remove the initial sensor data from storage in response to determining the confidence score associated with the comparison between the first sensor data and the initial sensor data exceeds a first threshold value of the one or more threshold values and based on receiving the first sensor data after receiving and storing the initial sensor data.

12. The non-transitory computer-readable medium of claim 7, wherein the instructions, when executed by the processor, are configured to cause the processor to:

receive intermediate sensor data of the plurality of sensor data after receiving the first sensor data;

determine an initial confidence score associated with comparison between the first sensor data of the plurality of sensor data and the intermediate sensor data exceeds an additional threshold value; and adjust the first sensor data based on the intermediate sensor data in response to determining the initial confidence score exceeds the additional threshold value.

13. The non-transitory computer-readable medium of claim 12, wherein the first sensor data is indicative of one or more initial notable attributes, the intermediate sensor data is indicative of one or more subsequent notable attributes, and the instructions, when executed by the processor, are configured to cause the processor to adjust the first sensor data by changing the one or more initial notable attributes indicated by the first sensor data to the one or more subsequent notable attributes indicated by the intermediate sensor data in response to determining the initial confidence score exceeds the additional threshold value.

14. An attraction system of an amusement park, the attraction system comprising:

a queue area; and a controller configured to:

receive first sensor data indicative of one or more first notable attributes associated with a first group of guests in a first location of the queue area;

receive second sensor data indicative of one or more second notable attributes associated with a second group of guests in a second location of the queue area;

determine a confidence score based on a comparison between the first sensor data and the second sensor data, wherein the confidence score is associated with a match between the first group of guests and the second group of guests;

compare the confidence score to a threshold value;

determine a wait time based on a duration of time between capture of the first sensor data and capture of the second sensor data in response to determining the confidence score exceeds the threshold value, wherein the duration of time is indicative of an amount of time elapsed during progression from the first location to the second location of the queue area; and adjust an operating mode of an attraction to have a shorter duration of operation in response to the determined wait time exceeding a threshold time.

15. The attraction system of claim 14, wherein the queue area comprises a first queue line and a second queue line, wherein the first queue line and the second queue line are configured to combine at a merge point, and wherein the second location of the queue area comprises the merge point.

16. The attraction system of claim 14, wherein the queue area comprises a single rider line.

17. The attraction system of claim 16, wherein the controller is configured to:

identify one or more riding groups comprising at least one guest in the first group of guests, the second group of guests, or both based on shared notable attributes;

estimate a number of single rider seats in a ride vehicle of the attraction system based on the identified riding groups; and generate a wait time estimate for the single rider line based at least in part on the estimated number of single rider seats.

18. The attraction system of claim 17, wherein the one or more riding groups are identified based on the one or more first attributes, the one or more second attributes, profile information for the first group of guests or the second group of guests, and/or common queue entry time stamps.

19. The attraction system of claim 17, wherein the one or more riding groups are identified based on data from outside of the attraction system in the amusement park.

20. The attraction system of claim 17, wherein the one or more riding groups comprise a first riding group identified based on the one or more first attributes or the one or more second attributes comprising an identified matching clothing item unique to the first riding group.

21. The attraction system of claim 15, wherein the controller is configured to adjust a manner in which the second queue line combines with the first queue line at the merge point in response to the determined wait time exceeding the threshold time.

* * * * *